Feb. 14, 1928.
C. R. RANEY
1,659,003
GRAIN SHOCKER
Original Filed June 22, 1923    3 Sheets-Sheet 2
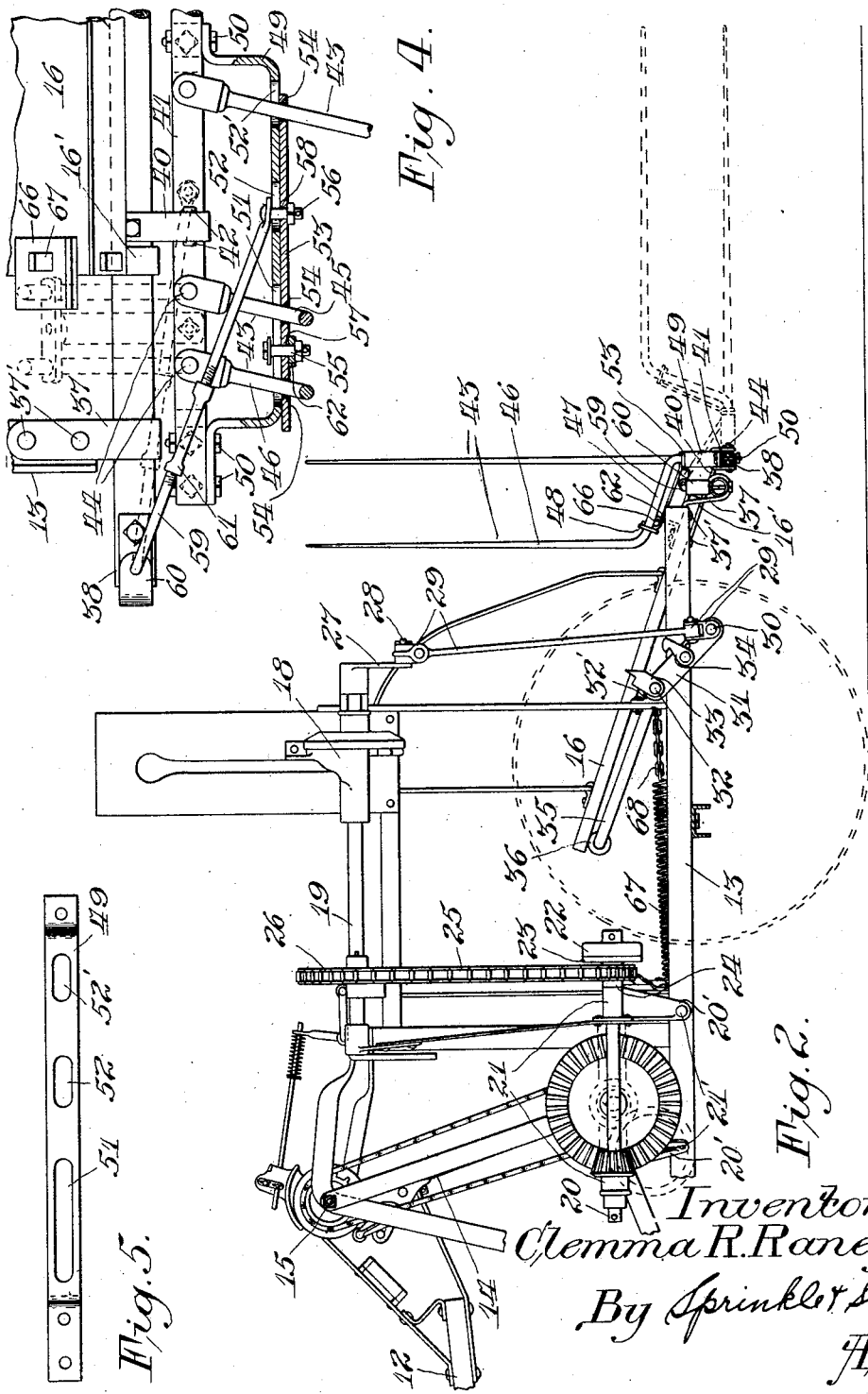
Inventor.
Clemma R. Raney,
By Sprinkle & Smith.
Atty.

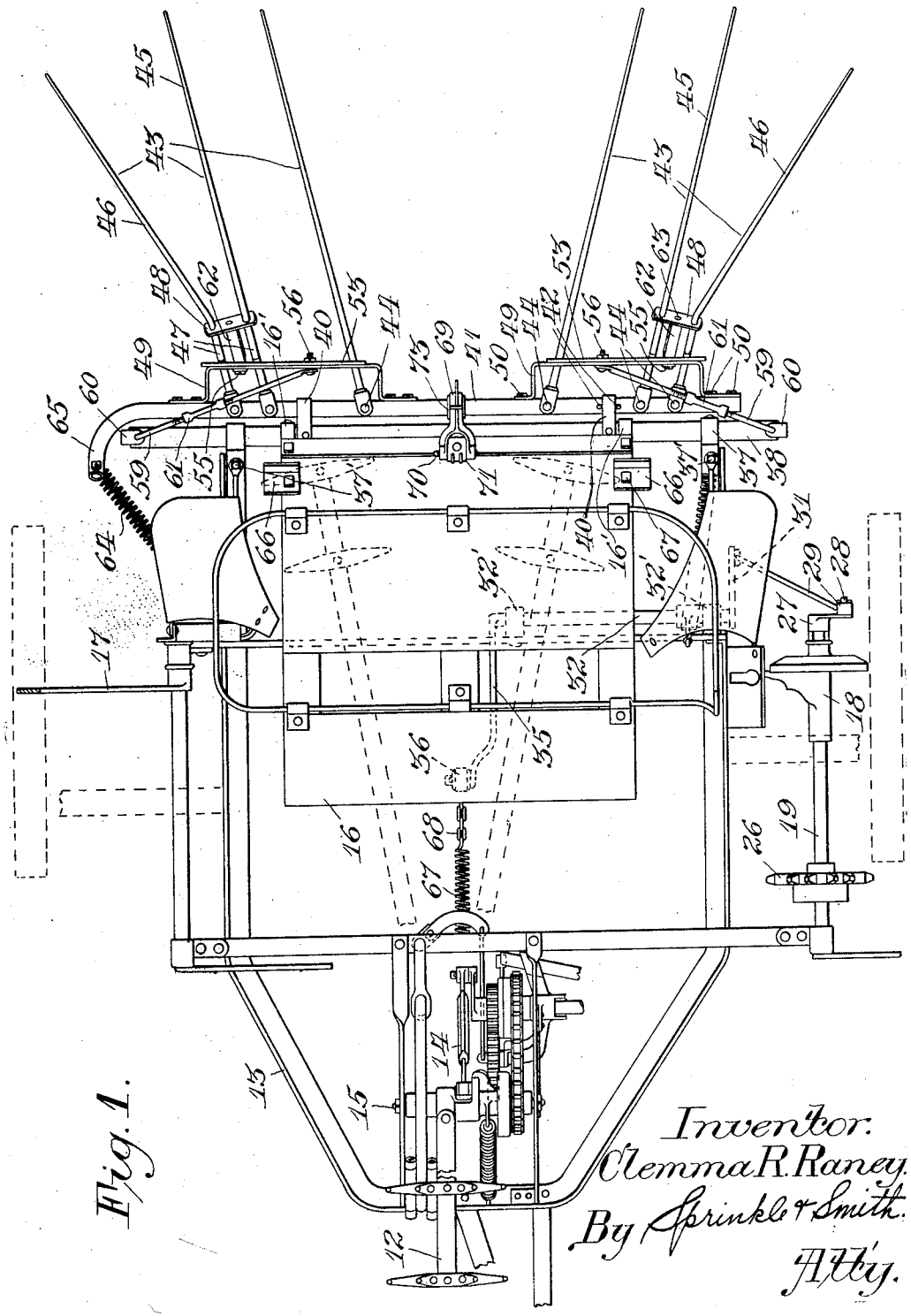

Feb. 14, 1928.
C. R. RANEY
1,659,003
GRAIN SHOCKER
Original Filed June 22, 1923  3 Sheets-Sheet 3
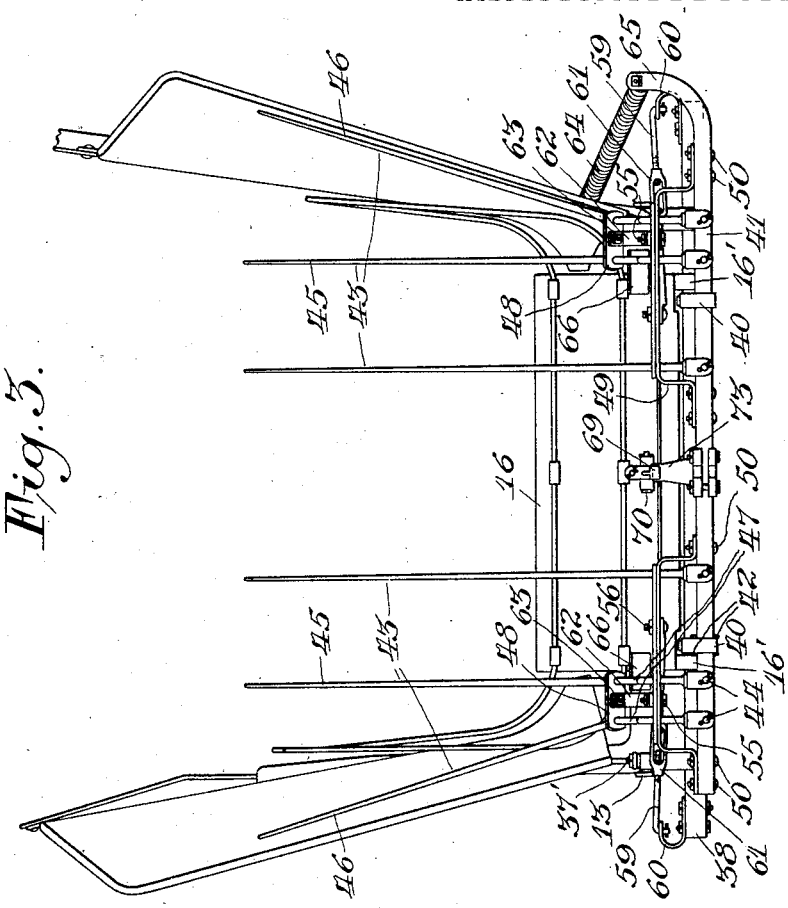
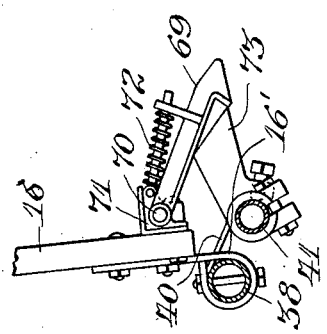
Inventor.
Clemma R. Raney,
By Sprinkle & Smith
Atty.

Patented Feb. 14, 1928.

1,659,003

UNITED STATES PATENT OFFICE.

CLEMMA R. RANEY, OF CHICAGO, ILLINOIS, ASSIGNOR TO INTERNATIONAL HARVESTER COMPANY, OF CHICAGO, ILLINOIS, A CORPORATION OF NEW JERSEY.

GRAIN SHOCKER.

Application filed June 22, 1923, Serial No. 647,066. Renewed September 29, 1927.

This invention relates to a grain shocker and more particularly to an improved construction in which the base of the shock set by the shocker is adequately spread to insure the proper ventilation and airing of the grain for curing or drying out the grain in the shock.

One of the objects of the present invention is to provide an improved shocking mechanism which will insure the building of stable shocks in the field capable of standing up under all weather conditions.

A further object of the device is to provide an improved means for automatically spreading the butts of the shock in a longitudinal and transverse direction.

A still further object of the invention is to provide an improved butt spreading mechanism adapted to spread the butts during the setting of the shock and also during the withdrawal of the shocker from the shock.

I obtain these objects by providing an improved means which co-operates with the shock discharging mechanism and engages the butts of all the sheaves, spreading these sheaves transversely as the shock is being set and longitudinally as the shocker is withdrawn from the shock so that these butts are adequately spread in both directions forming a substantial base and also providing sufficient ventilating space between all the sheaves of the shock, thereby insuring the proper curing and drying of the grain.

In order to disclose my invention, I have illustrated one embodiment of the same as shown in the accompanying drawings. It is, of course, to be understood that the embodiment shown herein for the purposes of illustration may be modified without departing from the spirit and scope of the invention.

Referring to the drawings—

Fig. 1 is a top plan view of the shocker having my improvements embodied therein;

Fig. 2 is a side elevational view of Fig. 1;

Fig. 3 is a rear elevational view of Fig. 1;

Fig. 4 is an enlarged detail view partly in section showing the mechanism for actuating my improved butt spreading device; and Figs. 5 and 6 are enlarged detail views of the different parts hereinafter more fully described.

The shocker shown is of the general type described and claimed in my U. S. Letters Patent No. 1,231,195, June 26, 1917, and No. 1,292,922, February 11, 1919, a rearwardly swinging sheaf delivery member or fork 12 being used which is carried on a shocker frame 13 and movable by means of a pitman connection 14 about an axis on a shaft 15 from its sheaf receiving position, (as shown in the full lines in Figs. 1 and 2), wherein it rests beneath the deck of a grain binder (not shown), to its sheaf delivering position (shown in dotted lines in Fig. 1) wherein it delivers the sheaves in prostrate position in an upwardly and rearwardly movable shock receptacle 16 carried by the rear end of the shocker frame.

Also, after the manner of construction described in my U. S. Letters Patent No. 1,231,195, June 26, 1917, and No. 1,242,112, October 2, 1917, when enough sheaves have been delivered to the shock receptacle 16 to build a shock therein of a predetermined size, a needle 17 and a knotter mechanism 18 are thrown into operation to compress and bind the shock, and at the completion of the compression and binding operation, through the rotation of a knotter shaft 19, the shock receptacle 16 is moved upwardly and rearwardly to deposit the shock in an upright position on the ground.

The fork 12 together with all the other operative mechanisms upon the present shocker are driven from a longitudinally driven power shaft 20. The forward end of this shaft is connected to a second shaft which is of extensible and flexible character deriving its power from the crank shaft of the harvester (not shown). The rear end of the shaft 20 is journaled in the bracket 21 fixed to the main frame 13 by depending ears 20' and bolts 21'.

As described in my Patent No. 1,231,195, June 26, 1917, and in a manner common to all shockers of this type, a continuously operating clutch member 22 is secured to the shaft 20. Engageable with the continuously operating clutch member 22 and adapted to be driven thereby is an intermittently operating clutch member 23 which is normally controlled by a pawl (not shown). Formed integrally with the intermittently operated clutch member 23 is a sprocket 24. The sprocket 24 operatively drives the knotter shaft 19 by means of a chain 25 trained about the sprocket 24 and about a sprocket 26 keyed to the shaft 19. Secured to the rear end of the knotter shaft 19 is a crank 27. The free end of the crank 27 is provided with a stud 28 which has pivotally secured thereto a knuckle joint and pitman connection 29. The lower end of the pitman connection 29 is pivotally secured by a similar knuckle joint 29' to a stud 30 fixed to a crank 31 journaled on the grainward end of a crank shaft 32 which in turn is journaled on the main frame 13 of the shocker by means of bearing brackets 32'. Secured to the grainward end of the crank shaft 32 adjacent the crank 31 is a second crank 33. The crank 33 is adapted to be engaged by a pivoted gravity pawl 34 in a manner hereinafter described. The stubbleward end of the crank shaft 32 is provided with a forwardly extending arm 35 which is provided with a roller 36 adapted to engage the bottom side of the shock receptacle as the same is actuated about its pivot in the normal operation of setting a shock. Secured to the opposite sides of the main frame 13 by means of bolts 37' are brackets 37 which are adapted to have secured thereto a transversely extending shaft or pipe 38. Tiltably mounted by means of hinge brackets 16' on the pipe 38 in a manner to be swung upwardly and rearwardly with respect thereto is the shock receptacle 16.

My improved mechanism for spreading the sheaves in the shock set by the shock receptacle during the setting of the shock and also during the withdrawal of the shocker from the shock will next be described. Secured to the pipe 38 are bearing brackets 40 which are adapted to pivotally support a transversely extending butt tine pipe 41. The pipe 41 is prevented from lateral displacement by cotter pins 42. Positioned on the opposite sides of the medial line of the shocker and pivoted to the butt tine pipe 41 are two oppositely disposed sets of butt spreading tines 43. The tines 43 are pivoted for lateral movement at 44 to the butt tine pipe 41. The two outer pairs of butt tines 43, indicated as 45 and 46 respectively, and positioned on the opposite sides of the shocker, are angularly bent at 47 to extend forwardly parallel to the inclined position of the receptacle 16. The bending of the tines 45 and 46 in this manner is for the purpose of extending the vertical portions of these tines forwardly (as shown in Fig. 2 in the full line position) to engage the butts of the sheaves at a point a considerable distance above the bottom of the shock. This arrangement insures a firm hold on the shock when this mechanism is actuated to spread the shocks when setting. These forwardly positioned tines 45 and 46 occupy a vertical plane extending transversely with respect to the shocker as shown in Fig. 2. It will be further noted that the tines 46 are also bent outwardly (as shown in Fig. 3) and normally assume a diverging position when the receptacle and butt tines are in their normal position of receiving the sheaves for building the shock. These tines are bent out laterally in order to properly space them from the adjacent tines. The outer pairs of tines 45 and 46 are tied together by a tie-bar 48. The butt spreading tines 43 are guided in their lateral movement by a U-shaped guiding member or bracket 49 secured by means of bolts 50 to the butt tine pipe 41. The guiding bracket 49 is provided with a plurality of slots 51, 52 and 52'. The slots 51 and 52' are adapted to guide the tines 43 in their lateral pivotal movement. The tines 43 are controlled or actuated to move laterally when the shock receptacle 16 is depositing a shock on the ground by means of a reciprocable bar 53 which is provided with a plurality of apertures 54. The apertures 54 are adapted to loosely receive the tines 43 and engage the tines at a point adjacent the guiding member 49. The bar 53 is slidingly connected to the guide member 49 by means of bolts 55 and 56 which extend through apertures 57 and 58, respectively, in the bar 53 and through registering slots 51 and 52, respectively, in the guide 49. The reciprocating bar 53 is actuated through the medium of a pitman connection 59 pivotally connected to the bolt 56 at one end and pivotally connected to a bracket 60 fixed to the pipe 38, at the other end. It will be noted that the pitman connection 59 may be adjusted in a manner to vary the lateral swing of the tines 43 by means of a turn buckle 61. The tie-bar 48 connecting the tines 45 and 46 is held from displacement by means of a connecting bar 62 which has its rearward end pivotally connected to the bolt 55 and its forward end pivotally connected to the tie-bar at 63. The butt tines 43 are normally returned to their vertical position or the position shown in full lines in Figs. 2 and 3 by means of an extension spring 64 which has its rearward end connected to an upwardly bent portion 65 of the pipe 41 and has its forward end connected to the shocker main frame. The tines 43 are maintained in their vertical position with respect to the receptacle 16 by means of the forwardly bent portions 47 of the tine 45 engaging the stops 66 secured by means of bolts 67 to the opposite sides of the receptacle 16. The receptacle 16 is normally returned to its full line position shown in Fig. 2 by means of an extension spring 67 and chain 68 connected to the bottom of the receptacle at one end and to the shocker frame at the other.

In connection with my new butt spreading mechanism, I have provided means for automatically locking and unlocking the tines to the shock receptacle which comprises a latch member 69 pivoted at 70 to a bracket 71 fixed to the receptacle 16. The latch 69 is normally pressed downwardly by means of a compression spring 72 into engagement with a pawl 73 secured to the pipe 41. The latch mechanism per se does not form any part of the present invention except that it does provide means for locking the butt tines 43 with respect to the receptacle 16 when the receptacle 16 is in its normal sheaf receiving position and automatically unlocks the tines from the receptacle 16 when the shock receptacle is depositing a shock upon the ground.

In the operation of my improved shock spreading mechanism, it will, of course, be understood that the shock is built prostrate in the receptacle 16 by means of the sheaf delivery member 12 delivering or conveying the sheaves from the binder deck of the harvester to the sheaf receptacle. When the sheaves in the shock receptacle have reached a predetermined height, the intermittently operated clutch member 23 is tripped, connecting this clutch member with the continuously operating clutch member 22. Through this mechanism, the knotter shaft 19 is driven by sprockets 24, 26 and chain 25, and the crank 27 is swung upwardly elevating the crank 31 until the gravity pawl 34 carried by crank 31 drops by its own weight and engages the second crank 33. Then, upon the downward movement of the crank 27, through the pitman connection 29 and crank 31, the pawl 34 is swung clockwise, swinging the arm 35 with the roller 36 upwardly and rearwardly. This upward and rearward movement of the crank 35 is transmitted to the shock receptacle 16, setting the shock in a vertical position and swinging the butt teeth 43 into the positions shown in full lines in Fig. 1 and dotted lines in Fig. 2. As the tines 43 are swung downwardly from their normal vertical position to the position shown in Fig. 1, they are swung outwardly into diverging positions which, of course, throws the butts of the shock engaged by these tines laterally or transversely with respect to the longitudinal or travel direction of the machine. It will, of course, be understood that as the shock is held prostrate in the shock receptacle 16, the tines 43, with the exception of the two outer tines 46, extend vertically through the butts of the shock with the tines 45 in advance of the more rearwardly positioned tines. As the shock receptacle 16 is swung rearwardly in unison with the tines 43, the tines 43 are swung laterally about their respective pivots 44 by the reciprocating bar 53 which in turn is drawn outwardly by the pitman connection 59, as shown in Fig. 4. In other words, the outer end of the pitman 59 is pivotally secured to a bracket 60, which is stationary on the main frame or pipe 38 and as the butt teeth are swung from the full line position shown in Fig. 2 to the dotted line position, the pitman causes the bar to slide outwardly on the guiding bracket 49 and thereby swing the tines 43 outwardly to their diverging positions shown in Fig. 1. It will be noted that when the shocker receptacle together with the butt tines assumes a predetermined position in the setting of a shock, as shown in Fig. 6, the latch 69 by reason of the construction of the pawl 73 automatically disengages the pawl from the latch and thereby permits the receptacle 16 to return to its normal bundle receiving position independently of the tines 43. It will further be noted that as the shocker is being withdrawn from the shock with the tines beneath the shock and in the position shown in Fig. 1, the forward bundles of the shock will be engaged by these more divergent or separated portions of the tines 43, and thus the forward or front bundles will be further spread in the transverse direction and in addition thereto the divergent portions of the tines will have a tendency to drag the sheaves with them and will cause a spreading of the shock in a longitudinal direction as well as in a transverse direction.

While in the above specification, I have described one embodiment which my invention may assume in practice, it will, of course, be understood that the same is capable of modification and that modification may be made without departing from the spirit and scope of my invention as expressed in the following claims.

What I claim as my invention and desire to secure by Letters Patent is:

1. A shocking machine comprising a frame, a shock discharging mechanism mounted thereon, a butt spreading mechanism pivotally mounted on said discharging mechanism for longitudinal and transverse movement with respect thereto, and a movable link connection connecting said butt spreading mechanism to said frame for actuating said butt spreading mechanism automatically when the shock discharging mechanism is actuated.

2. A shocking machine comprising a frame, a shock discharging mechanism carried by said frame, butt spreading mechanism pivotally mounted on said discharging mechanism for longitudinal and transverse movement, and means including a link connecting said butt spreading mechanism with said frame for automatically actuating said butt spreading mechanism transversely with respect to the longitudinal direction of travel of said machine when the shock discharging mechanism is actuated.

3. A shocking machine comprising a frame, a shock discharging mechanism carried by said frame, butt spreading mechanism pivotally mounted on said discharging mechanism for longitudinal and transverse movement, and means including a link positioned on the opposite sides of said frame connecting said butt spreading mechanism with said frame for automatically actuating said butt spreading mechanism transversely with respect to the longitudinal direction of travel of said machine when the shock discharging mechanism is actuated.

4. A shocking machine comprising a frame, a shock discharging mechanism mounted thereon, a butt spreading mechanism pivotally mounted on said discharging mechanism for longitudinal and transverse movement with respect thereto, and a transversely movable connection connecting said butt spreading mechanism to said frame for automatically actuating said butt spreading mechanism when said discharging mechanism is actuated.

5. A shocking machine comprising a frame, a shock discharging mechanism mounted thereon, a butt spreading mechanism pivotally mounted on said discharging mechanism for longitudinal and transverse movement with respect thereto, and a pitman connection connecting said butt spreading mechanism to said frame for actuating said butt spreading mechanism.

6. A shocking machine, comprising a frame, a shock discharging mechanism mounted thereon, a butt spreading mechanism pivotally mounted on said discharging mechanism for longitudinal and transverse movement, a guiding member carried by said butt spreading mechanism, and means connected to said guiding member for actuating said butt spreading mechanism to move transversely with respect to said machine for spreading the butts of the shock set by said shocking machine.

7. A shocking machine, comprising a frame, a shock discharging mechanism mounted thereon, a butt spreading mechanism pivotally mounted on said discharging mechanism for longitudinal and transverse movement, a guiding member carried by said butt spreading mechanism, and means slidably connected to said guiding member for actuating said butt spreading mechanism to move transversely with respect to said machine for spreading the butts of the shock set by said shocking machine.

8. A shocking machine comprising a frame, a shock discharging mechanism mounted thereon, a plurality of butt spreading tines pivotally mounted on said discharging mechanism for longitudinal and transverse movement, a guiding member carried by said discharging mechanism, a reciprocable member engageable with said tines and slidably connected to said guiding member for actuating said tines to swing laterally with respect to the machine as the shock is being set by said discharging mechanism.

9. A shocking machine comprising a frame, a shock discharging mechanism mounted thereon, and a butt spreading mechanism comprising a plurality of butt engaging tines pivoted to said discharging mechanism, certain of said tines extending forwardly of their pivots for engaging the butts of the shock at points a substantial distance from the plane of the base of the shock.

10. A shocking machine comprising a frame, a shock discharging mechanism mounted thereon, and a butt spreading mechanism comprising a plurality of butt engaging tines pivoted to said discharging mechanism, certain of said tines being positioned on the opposite sides of said machine and extending forwardly of their pivots for engaging the butts of the shock above the plane of the base of the shock.

11. A shocking machine comprising a frame, a discharging mechanism mounted thereon, and a plurality of butt spreading tines pivoted to said discharging mechanism, certain of said tines being bent forwardly of their pivots so as to occupy a vertical plane transverse with respect to the longitudinal direction of said machine when the discharging mechanism is in its normal position for building a shock.

12. A shocking machine comprising a frame, a shock discharging mechanism carried thereby, a plurality of tines pivoted for vertical and transverse movement with respect to said discharging mechanism, and an adjustable pitman connection connecting said pivoted tines with said frame for actuating said tines when said discharging mechanism is actuated to discharge a shock.

13. In a shocking machine having a frame, the combination of a shock discharging mechanism mounted thereon, means mounted on the discharging mechanism for spreading the butt of the shock when the same is discharged, and a movable connection between the spreading means and frame for controlling the spreading action of said spreading means.

14. In a shocking machine having a frame, the combination of a shock discharging mechanism mounted thereon, butt spreading mechanism controlled by the discharging mechanism, movable means connecting the discharging and spreading mechanisms, and means for adjusting said latter means to limit the spreading action of the butt spreading means.

In testimony whereof I have signed my name to this specification on this 18th day of June A. D. 1923.

CLEMMA R. RANEY.